(12) United States Patent
Watts et al.

(10) Patent No.: US 9,194,950 B2
(45) Date of Patent: Nov. 24, 2015

(54) HANDHELD LOCATING DEVICE

(71) Applicant: Black & Decker Inc., Newark, DE (US)

(72) Inventors: Fred S. Watts, New Freedom, PA (US);
Christine H. Potter, Phoenix, MD (US);
Muniswamappa Anjanappa, Ellicott City, MD (US); Xia Chen, Clarksville, MD (US); Si Li, Waukesha, WI (US)

(73) Assignee: Black & Decker Inc., Newark, DE (US)

( * ) Notice: Subject to any disclaimer, the term of this patent is extended or adjusted under 35 U.S.C. 154(b) by 204 days.

(21) Appl. No.: 13/742,614

(22) Filed: Jan. 16, 2013

(65) Prior Publication Data

US 2013/0207830 A1    Aug. 15, 2013

Related U.S. Application Data

(60) Provisional application No. 61/588,320, filed on Jan. 19, 2012.

(51) Int. Cl.
*G01S 13/04* (2006.01)
*G01S 13/56* (2006.01)
*G01V 3/10* (2006.01)
(Continued)

(52) U.S. Cl.
CPC ............... *G01S 13/888* (2013.01); *G01V 3/08* (2013.01); *G01V 3/10* (2013.01); *G01V 3/12* (2013.01); *G01S 13/56* (2013.01); *G01S 13/86* (2013.01)

(58) Field of Classification Search
CPC ......... G01S 13/02; G01S 13/50; G01S 13/52; G01S 13/56; G01S 13/86; G01S 13/88; G01S 13/887; G01S 13/888; G01V 3/08; G01V 3/12; G01V 3/10

USPC ............... 342/13–22, 24, 27, 28, 52–55, 175, 342/176, 179, 195; 250/336.1, 338.1, 250/339.01, 339.05; 324/323, 326–329, 324/347, 354, 357, 360, 600, 629, 637, 324/642–646, 66, 67, 649, 654–690; 73/570, 584, 596, 599, 600
See application file for complete search history.

(56) References Cited

U.S. PATENT DOCUMENTS 4,063,161 A * 12/1977 Pardis ........................... 324/360
4,814,768 A * 3/1989 Chang ........................... 342/22
(Continued)

FOREIGN PATENT DOCUMENTS

DE   102009054950 A1   6/2011
EP       0999445 A2    5/2000
WO    2009067627 A1   5/2009

OTHER PUBLICATIONS

Luca Breccia, European Search Report and Annex to the European Search Report on European Patent Application No. EP13151711, Jul. 31, 2013, The Hague.

*Primary Examiner* — Bernarr Gregory
(74) *Attorney, Agent, or Firm* — Adan Ayala

(57) ABSTRACT

A locating device disposable on a surface has a housing, a capacitance sensor, a radar sensor, and an inductance sensor. The locating device also has a motion sensor disposed for detecting at least one motion parameter. A controller receives data from the capacitance sensor, the radar sensor, the inductance sensor and the motion sensor, and determines from the data a presence of objects disposed within or behind the surface. A display is used for displaying a graphical representation of the objects disposed within or behind the surface.

16 Claims, 3 Drawing Sheets

(51) Int. Cl.
  *G01V 3/12* (2006.01)
  *G01S 13/88* (2006.01)
  *G01V 3/08* (2006.01)
  *G01S 13/00* (2006.01)
  *G01V 3/00* (2006.01)
  *G01S 13/86* (2006.01)

(56) References Cited

U.S. PATENT DOCUMENTS

| | | | |
|---|---|---|---|
| 5,973,618 A * | 10/1999 | Ellis | 342/24 |
| 6,378,375 B1 * | 4/2002 | Kobayashi | 73/600 |
| 6,501,414 B2 * | 12/2002 | Arndt et al. | 342/22 |
| 7,009,399 B2 * | 3/2006 | Olsson et al. | 324/326 |
| 7,605,743 B2 * | 10/2009 | Skultety-Betz et al. | 342/22 |
| 7,755,360 B1 | 7/2010 | Martin | |
| 7,834,801 B2 * | 11/2010 | Waite et al. | 342/22 |
| 7,956,794 B2 * | 6/2011 | Skultety-Betz et al. | 342/22 |
| 8,026,711 B2 * | 9/2011 | Krapf et al. | 324/326 |
| 8,111,169 B2 * | 2/2012 | Krapf et al. | 324/67 |
| 8,334,703 B2 * | 12/2012 | Mostov | 324/642 |
| 8,546,759 B2 * | 10/2013 | Skultety-Betz et al. | 250/339.05 |
| 2004/0070399 A1 | 4/2004 | Olsson et al. | |
| 2007/0296955 A1 | 12/2007 | Skultety-Betz et al. | |
| 2008/0231525 A1 | 9/2008 | Krapf et al. | |
| 2010/0026508 A1 | 2/2010 | Krapf et al. | |
| 2010/0225299 A1 | 9/2010 | Nguyen et al. | |

* cited by examiner

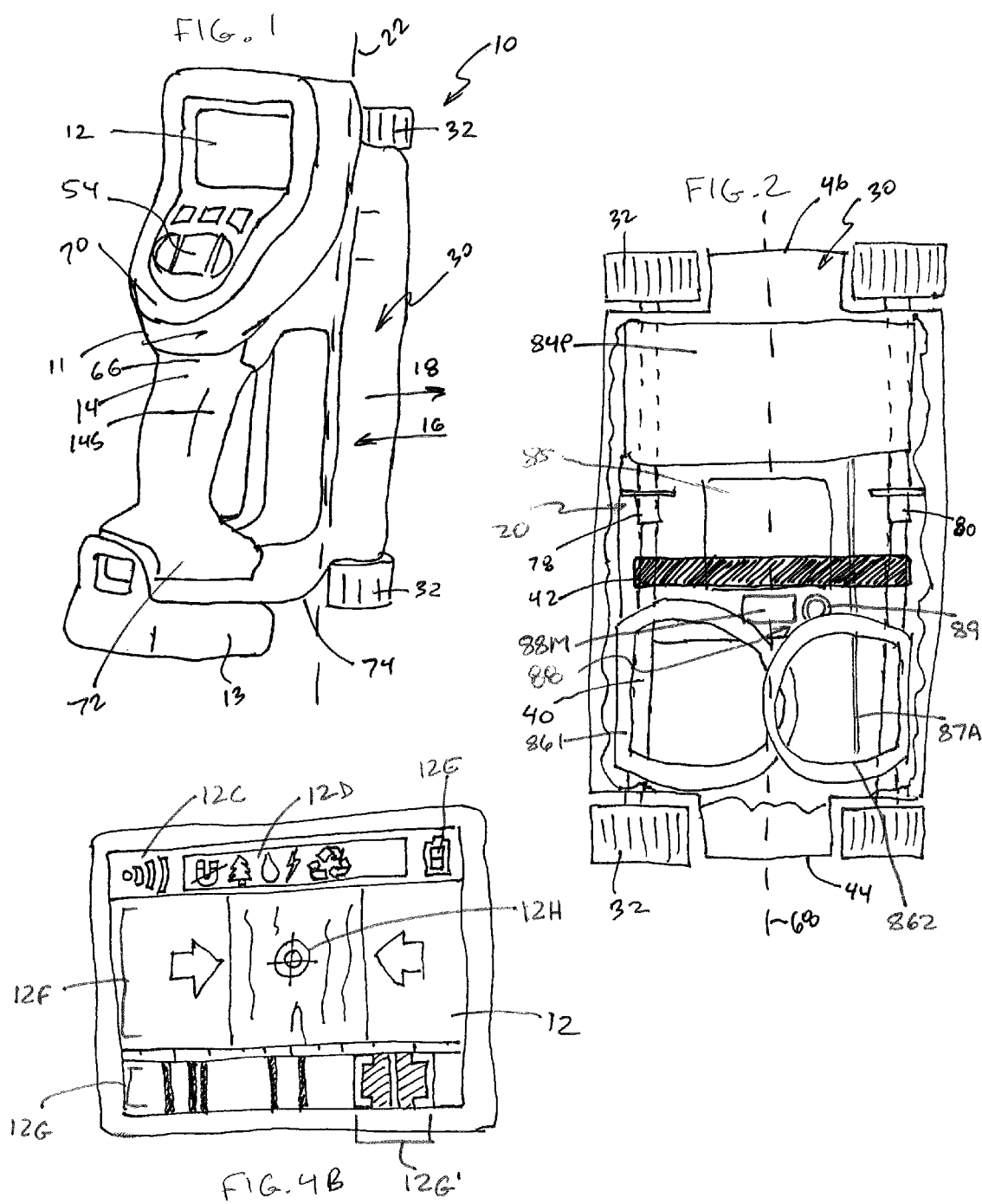

HANDHELD LOCATING DEVICE

CROSS-REFERENCE TO RELATED APPLICATIONS

This application claims the benefit of U.S. Provisional Application Nos. 61/588,320, filed on Jan. 19, 2012. The entire disclosure of the above application is incorporated herein by reference.

FIELD OF THE INVENTION

The present invention relates to a handheld locating device.

BACKGROUND

Locating devices for locating objects disposed behind a wall or surface are known. Some devices, such as the one described on U.S. Pat. Nos. 6,886,269, 7,414,235 and 7,453,253, all of which are hereby incorporated by reference, have a housing, a display unit, a water pipe detector, and at least one sensor unit for picking up a first motion parameter. Such locating devices indicate located objects immediately upon detection. However, such indications can be erroneous due to errors in calibration, scanning, etc.

It is an object of the invention to provide an apparatus and method for identifying and indicating located objects, such as metal wiring, plastic pipes, etc., with a high degree of accuracy and confidence.

BRIEF DESCRIPTION OF THE DRAWINGS

FIG. 1 shows a locating device in a right-side perspective view.

FIG. 2 is a partial cross-sectional view from the rear of the locating device of FIG. 1.

FIG. 4 shows a display of the locating device of FIG. 1, where FIGS. 4A-4B show exemplary pre-scanning and post-scanning images, respectively.

DESCRIPTION

Figure 3:
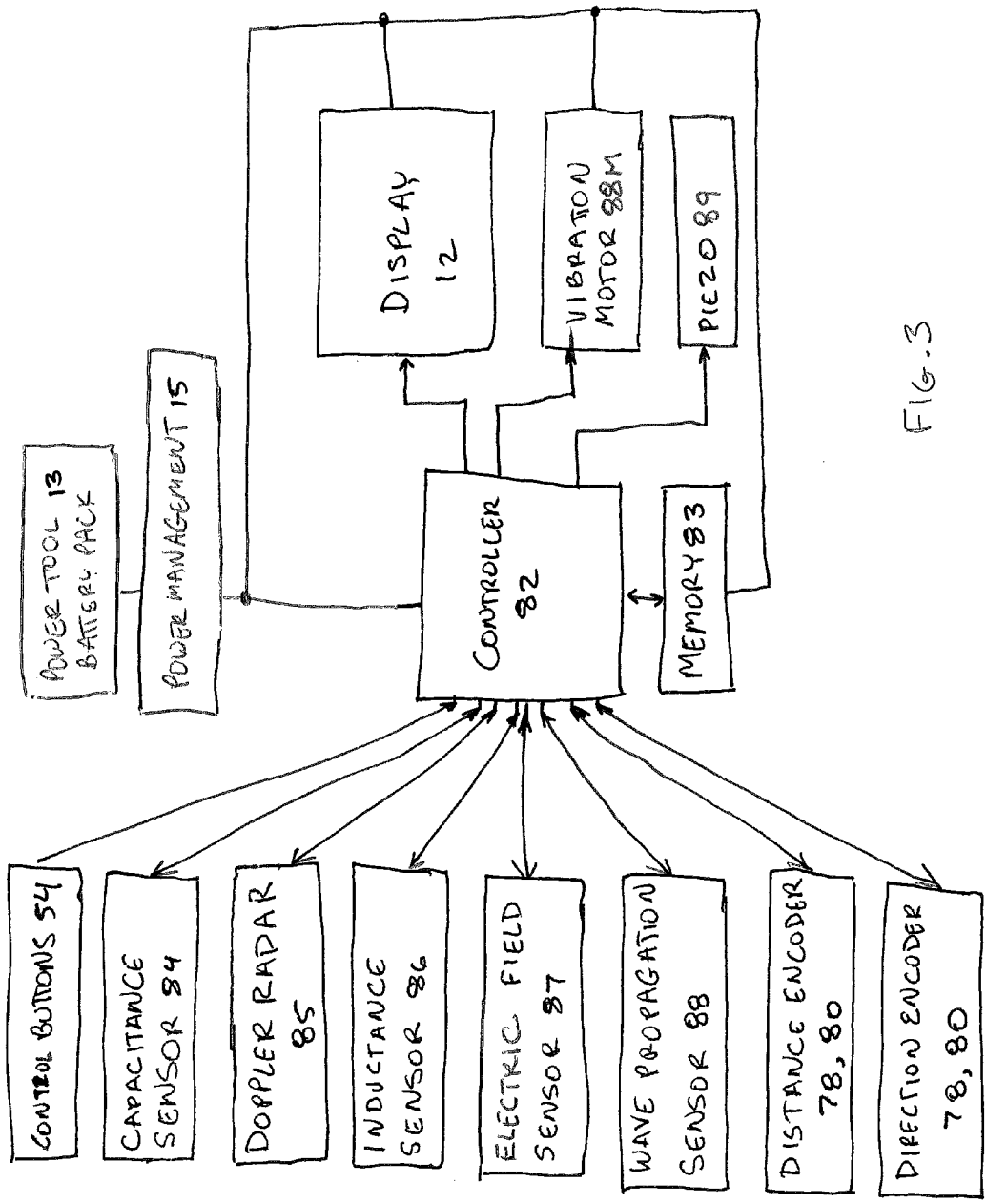
FIG. 3 is a block diagram showing the main components of the locating device of FIG. 1.

FIGS. 1-2 shows a locating device 10 with a housing 11. The housing 11 is preferably movable in two preferred, opposed motions 16, 18, which extend perpendicular to a longitudinal direction 22 of housing 11.

On its top side 70, housing 11 may have a handle 14 with a surface 14S to be grasped by the user. The handle 14 preferably extends in preferably the longitudinal direction 22 of the housing 11 and is embodied symmetrically to a plane that is defined by a longitudinal center axis 68.

Handle 14 may have a diamond-shaped cross-sectional area that narrows in the direction of the top side 70. Handle 14 preferably has a first end 72 which points in the longitudinal direction 22 of the housing 11 toward an end region 74 of the housing 11, and merges with the housing 11.

Handle 14 may also have a second end 66. On its second end 66 or adjacent to second end 66, handle 14 and/or housing 11 may have control buttons 54. Control buttons 54 are preferably disposed about 1-2 inches (25-50 mm) from second end 66, allowing the user to guide the locating device 10 with one hand using the handle 14 and at the same time operate the control buttons 54 with her thumb.

A power tool battery pack 13 may be electrically and mechanically connected to the end region 74 and/or first end 72. Battery pack 13 may power the different electric and electronic components of locating device 10. A power management circuit 15 (FIG. 3) can be electrically connected to battery pack 13 to control the amount of power sent to the different electric and electronic components of locating device 10.

Housing 11 may also have a display 12 near control elements 54. The display 12 may be a color LCD screen, such as a thin-film transistor (TFT) LCD display. Further details on the functionality of display 12 are provided below. Persons skilled in the art will recognize that display 12 may not be on housing 11, but may be disposed on a separate housing or object altogether. For example, display 12 may be found on a cellphone or separate display wirelessly communicating with locating device 10.

Housing 11 also has a rear portion 30, having opposite face ends, 44, 46 Preferably, rear portion 30 carries two axles 40, each axle 40 carrying two roller bodies 32, preferably embodied as wheels, disposed on opposite face ends 44, 46.

For picking up motion parameters, the locating device 11 has a sensor unit 20 with two optoelectronic sensors 78, 80, with which a first and a second motion parameter can be detected. The sensors 78, 80 of the sensor unit 20 are formed by optoelectronic components, or more specifically bifurcated light gates. A sensor that could be used for this application could be the Omron EE-SX1131 photomicrosensor.

For detecting the motion parameters, each sensor 78, 80 is coupled to a respective axle 40, so that the first motion parameter can be detected via the first axle 40 and the second motion parameter can be detected via the second axle 40. Because each sensor 78, 80 preferably have two light gates with a suitable offset from one another, it is possible to determine both the travelled distance (by tracking the number of axle rotations) and the motion direction 16, 18 of the locating device 10 using the sensor unit 20 via a phase relationship of the two output signals from only one sensor. Alternatively, because each sensor 78, 80 can provide both travelled distance and direction, it also possible to only provide one sensor 78 on one of the axles 40, and connect axles 40 via a toothed belt 42, obviating the need for a second sensor 80.

Referring to FIG. 3, locating device 10 has a controller 82. Controller 82 includes at least one microprocessor. Controller 82 receives inputs from several sources, such as control buttons 54 and sensors 78 and/or 80, etc. and outputs information that can be used meaningfully by the user. Some of these input sources are different sensors for locating objects disposed behind a wall surface, and preferably include a capacitance sensor 84, a Doppler radar sensor 85, an inductance sensor 86, an electric field sensor 87 and a wave propagation sensor 88.

Capacitance sensor 84 preferably includes a plate 84P disposed on the rear portion 30. Preferably plate 84P is centered relative to center axis 68. Plate 84P is preferably connected to one side of a double-sided printed circuit board.

Capacitance sensor 84 may also have a circuit for coupling plate 84P to controller 82. Such circuit may include a controller integrated circuit, such as Analog Devices AD7147 controller. Preferably, the circuit is disposed on the other side of the double-sided printed circuit board.

Preferably, capacitance sensor 84 includes shielding, whether it consists of a second plate (not shown), display 12, and/or a printed circuit board, such as the double-sided printed circuit board mentioned above. In this manner, if the user places his hand on housing 11, it will not affect the capacitance readings sensed by plate 84P.

Doppler radar sensor 85 preferably includes a sensor module such as the AgilSense HB100 sensor module. Preferably, radar sensor 85 is disposed below plate 84P, and is centered relative to center axis 68. Persons skilled in the art will recognize that Doppler radar is sensitive to travel speed. Therefore, it is preferable that controller 82 keep track of the speed of the device 10 (by taking into account the travelled distance information received from sensor 78, 80 and the travel time) and use such information to mathematically compensate for the radar signal.

Inductance sensor 86 preferably includes a first coil 861 which is activated by transmitting electrical pulses therethrough, and a second coil 862 which senses reactive fields modulated by the presence or absence of an object interacting with the electric field created by the first coil 861 or receives any reactive fields caused by an object interacting with the electric field created by the first coil 861. Preferably, coils 861, 862 are disposed below radar sensor 85.

Electric field sensor 87 preferably includes an antenna 87A for detecting electric fields. The antenna 87 A is preferably connected to controller 82.

A wave propagation sensor 88 preferably includes a vibrating motor 88M that vibrates to cause the wall to vibrate as well. Alternatively, motor 88M can reciprocate a plunger that causes a series of taps along the wall. As the locating device 10 is moved along the wall, the amplitude and/or frequency of the wall's vibrations will depending on the proximity of the locating device 10 to a wood stud. Such amplitude and/or frequency can be detected by a microphone or piezo 89, which is preferably part of the wave propagation sensor 88. The information is then provided to controller 82 which can then analyze the amplitude and/or frequency of the wall's vibration to determine the location of an object. For example, controller 82 can perform a frequency distribution analysis to the output of the wave propagation sensor 88.

Persons skilled in the art will recognize that capacitance sensor 84 can detect wood studs and metal studs. Capacitance sensor 84 may also recognize electric wire, ferrous metal pipe, non-ferrous metal pipe and PVC pipes carrying water, especially if they are very close to the locating device 10.

Similarly, radar sensor 85 can detect wood studs and metal studs. Radar sensor may also recognize ferrous metal pipe, non-ferrous metal pipe and plastic (e.g., PVC) pipes with or without water, regardless of their proximity to the locating device 10. Inductance sensor 86 can detect metal stud, electric wire, ferrous metal pipe and non-ferrous metal pipe. The electric field sensor 87 can detect electric wires. The wave propagation sensor 88 can detect wood studs or metal studs, i.e., any objects that change the stiffness of the wall.

Because the different sensors can detect different types of objects, having multiple sensors detect the same object can be used by controller 82 increase the confidence level on the presence of the object, as well as the type of object being detected. For example, if controller 82 receives inputs from the capacitance and radar sensors 84, 85, but not from the inductance sensor 86, controller 82 can assume that the detected object is a wood stud, rather than a metal pipe or stud. The following table indicates the different inputs that would indicate the type of detected object:

| INPUTS FROM | DETECTED OBJECT |
| --- | --- |
| Capacitance Sensor 84 + Radar Sensor 85 | Wood Stud |
| Capacitance Sensor 84 + Radar Sensor 85 + Inductance Sensor 86 | Metal Stud |

-continued

| INPUTS FROM | DETECTED OBJECT |
| --- | --- |
| Capacitance Sensor 84 + Radar Sensor 85 + Inductance Sensor 86 | Ferrous Metal Pipe |
| Capacitance Sensor 84 + Radar Sensor 85 + Inductance Sensor 86 | Non-Ferrous Metal Pipe |
| Electric Field Sensor 87 + Radar Sensor 85 + Inductance Sensor 86 | Electric Wire |
| Radar Sensor 85 | PVC Pipe (Empty) |
| Capacitance Sensor 84 + Radar Sensor 85 | PVC Pipe (Carrying Water) |

Persons skilled in the art will recognize that the above table shows the inputs into controller 82 that would help controller 82 identify the detected object. Controller 82 may also take into account the amplitudes of the different signals to help identify the object. For example, even though PVC pipe and wood studs have the same inputs (radar and capacitance), the capacitance sensor would give a strong signal for wood and a very weak signal for PVC. Accordingly, in a preferred embodiment, each object could be assigned a primary sensor and additional optional secondary sensors to improve the accuracy of detection and type recognition.

Persons skilled in the art will recognize that controller 82 can also identify the different objects by their width or distance between items. In other words, if an object is detected that is about 1.5 inches wide, controller 82 may interpret such object to be a stud. Similarly, controller 82 notes that two objects are about 16, 24 or 36 inches apart and made of wood, as wood studs are normally provided at such distances, controller 82 can increase the confidence level for both objects.

Figure 5:
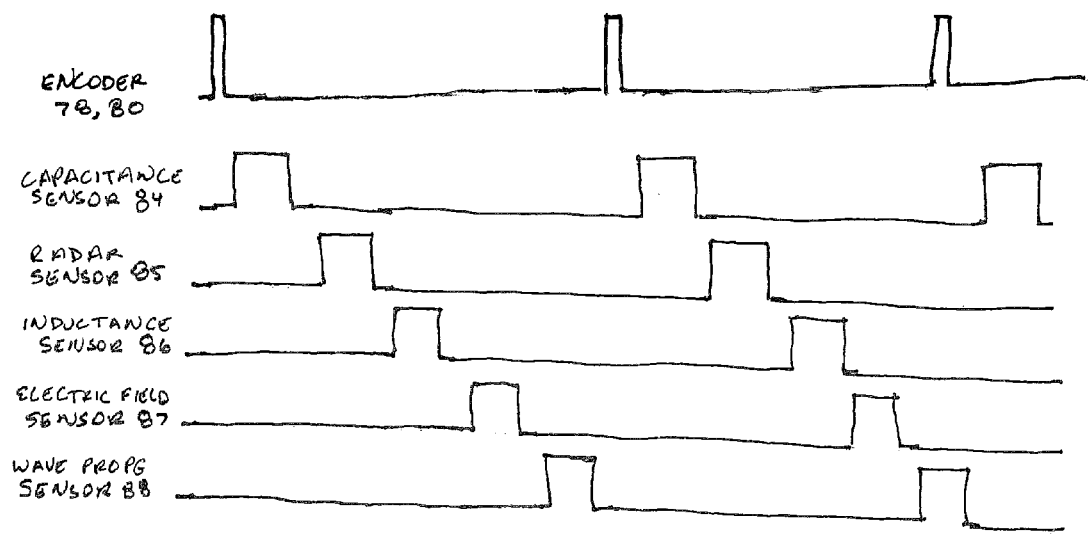
FIG. 5 illustrates the timing of different sensors being queried by a controller.

To avoid cross-talk between the different sensors, for example, the electric field created by first loop 861 of the inductance sensor 86 being detected by antenna 87A of the electric field sensor 87, it is preferable that controller 82 activate, query and deactivate one sensor at a time, rather than have all the sensors active at all times. FIG. 5 illustrates such query process, where one sensor is activated once all other sensors are deactivated. In this manner, no false objects are detected due to cross-talk between sensors. In addition, persons skilled in the art will recognize that, since there is no cross-talk between sensors, it is not necessary for the user to select a particular mode of operation/detection to the exclusion of others.

It is preferable that information from the sensor 78, 80 be used to initiate a sensor cycle. In other words, when an encoder pulse is received from sensor 78, 80, controller 82 begins the cycle of activating and queering each sensor sequentially. When the cycle is complete, controller 82 preferably stops the query process and only restarts when another encoder pulse is received.

Persons skilled in the art will recognize that, to avoid overlap between cycles, it is preferable to have a predetermined maximum speed limit so that a new encoder pulse does not occur before the previous cycle has finished. Accordingly, controller 82 may stop the query process and display a message stating that the user is moving the locating device 10 too fast or telling the user to slow down the movement of locating device 10.

Due to the use of multiple sensors to detect objects, there is no need to calibrate the locating device 10. Instead, the user can just turn on locating device 10, place it anywhere against the wall to be scanned and begin the scanning process. As locating device 10 is moved from a starting point, controller 82 stores data related to the detected objects, the distance of the objects relative to the starting point and the confidence level on the data at such location in a memory 83. Persons skilled in the art will recognize that the data related to distance (and direction) is provided by sensors 78 and/or 80 to controller 82.

Figure 4A:
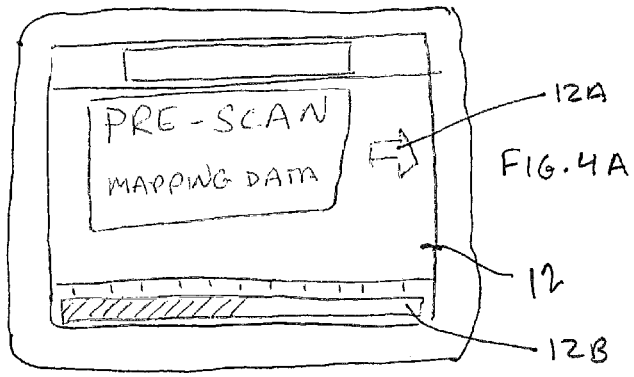

While the user is scanning the wall, display 12 may show the image shown in FIG. 4A. Preferably display 12 would show an arrow 12A indicating the detected direction of movement for locating device 10. Display 12 may also show a bar 12B indicating the amount of memory being used by the stored data and/or remaining available capacity.

After the user has scanned the desired portion of the wall, the user can move locating device 10 (without lifting locating device 10 off the wall) to any location within the scanned portion.

Persons skilled in the art will recognize that, during such movement, controller 82 can still poll sensors 84-88 to confirm that the newly sensed data matches the previously sensed (and stored) data. If the newly sensed data matches the previously sensed data, the confidence level on the stored data at a particular location can be increased. Conversely, if the newly sensed data does not match the previously sensed data, the confidence level on the stored data at the particular location can be decreased. These changes on confidence level data can be stored in memory 83.

Another advantage of having multiple sensors is that locating device 10 can detect multiple objects at the same location. For example, a nail or screw can be detected on top of a wood stud. Such determination can be achieved because the wood stud would be recognized by the capacitance and radar sensors 84, 85, where the nail can be recognized by the capacitance, radar and inductance sensors 84-86. When such situation occurs, controller 82 may suggest to user (via display 12) to scan a couple of inches above the current height to confirm the lack of presence of a metal plate or nail, etc.

Persons skilled in the art shall understand that the confidence level refers to the confidence that an object at a particular point (e.g., behind housing 11) will be at the displayed location and/or made of the material detected and/or displayed by the locating device 10. The confidence level for each object can be increased or decreased by controller 82 depending on the sensor inputs. For example, as discussed above, if controller 82 receives inputs from two sensors, but not a third, controller 82 can discern the material of the object and increase the confidence level.

The confidence level can also be increased if certain objects of the same material, e.g., wood or metal studs, are disposed at a predetermined distance, such as 16 or 24 inches, respectively. Persons skilled in the art will recognize that these distances between objects are relatively common in current construction practices.

Referring to FIG. 4B, display 12 will have an area 12F showing the type of object that is directly behind locating device 10. Persons skilled in the art will recognize that, because controller 82 has determined the type of detected object and its location, the display 12 can have a representative graphic of the detected object (e.g., a wood stud or metal pipe) adjusted to the appropriate detected width of the object. Preferably, the object's image shown in area 12F will be substantially equal in width to the actual object behind the wall.

Area 12F may also show a reticle 12H. Display 12 may have an information area providing information about the location indicated by reticle 12H. For example, display 12 can show object material icons 12D, indicating whether the detected object is made of wood, non-ferrous metal, PVC/plastic, and/or is carrying water or electricity. The information area can also have a battery charge icon 12E indicating the state of charge of power tool battery pack 13.

Similarly, display 12 can have a confidence level icon 12C with different numbers of bars indicating whether there is a high or low confidence level on the detected data, much in the same way as many cell phones indicate the strength of wi-fi and/or cell signals. For example, if the confidence level on a particular object is high, confidence level icon 12C may show 4 or 5 bars, whereas if the confidence on a particular object is low, confidence level icon 12C may show 1 bar. Persons skilled in the art will recognize that confidence level can be shown in other ways, such as providing a confidence level percentage, etc.

Underneath area 12F, it is preferable to have a representation 12G of a portion (and preferably the entire portion) of the scanned wall portion. In this manner, users can see the different objects that were found in the scanned wall portion. It is preferable to have a highlighted portion 12G' that shows where the object shown in area 12F is located in the scanned wall portion relative to the other objects.

Locating device 10 may also have other means for communicating information to the user. Referring to FIG. 3, controller 82 may activate vibration motor 88M and/or piezo 89 to provide haptic and audio feedback to the user in particular instances. For example, motor 88M can be activated every time an object is detected. Similarly, piezo 89 can provide a tone when locating device is being moved over a detected stud. Preferably, such tone will begin when reticle 12H is directly located in front of a leading edge of the stud and end when reticle 12H is directly located in front of a trailing edge of the stud.

The description of the invention is merely exemplary in nature and, thus, variations that do not depart from the gist of the invention are intended to be within the scope of the invention. Such variations are not to be regarded as a departure from the scope of the invention.

What is claimed is:

1. A locating device disposable on a surface comprising:
a housing;
a capacitance sensor disposed within the housing;
a radar sensor disposed within the housing;
an inductance sensor disposed within the housing;
a motion sensor disposed within the housing for detecting at least one motion parameter;
a controller receiving data from the capacitance sensor, the radar sensor, the inductance sensor and the motion sensor, the controller determining from the data a presence of objects disposed below or behind the surface; and
a display connected to the controller for displaying a graphical representation of the objects disposed below or behind the surface.

2. The locating device of claim 1, wherein the motion sensors comprises a wheel, and a rotation sensor coupled to the wheel and connected to the controller for sending motion data to the controller.

3. The locating device of claim 1, wherein the display displays a graphical representation of an object disposed directly behind the locating device.

4. The locating device of claim 3, wherein the housing is moved throughout a range of positions, and the display displays a graphical representation of the objects disposed within or behind the surface throughout the entire range of positions.

5. The locating device of claim 1, further comprising an electric field sensor connected to the controller.

6. The locating device of claim 1, wherein the controller activates one of the capacitance sensor, the radar sensor, the inductance sensor and the electric field sensor, the controller then queries the one of the capacitance sensor, the radar sensor, the inductance sensor and the electric field sensor, the controller then deactivates one of the capacitance sensor, the radar sensor, the inductance sensor and the electric field sensor, and the controller then activates another of the capacitance sensor, the radar sensor, the inductance sensor and the electric field sensor.

7. The locating device of claim 1, wherein the controller activates the one of the capacitance sensor, the radar sensor, the inductance sensor and the electric field sensor after receiving a pulse from the motion sensor.

8. The locating device of claim 1, wherein the housing is moved throughout a range of positions, the controller tracking the position of the housing from the data sent by the motion sensor.

9. The locating device of claim 8, wherein the controller stores in a memory the data received from at least one of the capacitance sensor, the radar sensor, and the inductance sensor, with corresponding position data.

10. The locating device of claim 8, wherein the controller stores in a memory the data received from at least one of the capacitance sensor, the radar sensor, and the inductance sensor, with corresponding position data and a corresponding confidence level data for the data for such position.

11. The locating device of claim 10, wherein the controller increases the confidence level data when multiple passes of the housing over such position provides substantially the same data from the at least one of the capacitance sensor, the radar sensor, and the inductance sensor.

12. The locating device of claim 10, wherein the display displays a graphical representation of the confidence level data for the particular position of the housing.

13. The locating device of claim 1, further comprising a wave propagation sensor.

14. The locating device of claim 1, further comprising at least one of a vibration motor and a sound generator, the at least one of a vibration motor and a sound generator being activatable by the controller.

15. The locating device of claim 1, wherein the display shows information on confidence level for a detected object disposed within or behind the surface.

16. The locating device of claim 1, further comprising a power tool battery pack that is electrically connectable to a power tool.

* * * * *